United States Patent [19]

Mladota

[11] 4,025,434
[45] May 24, 1977

[54] SCREEN CHANGER WITH PRE-FILL SCREEN BLOCKS

[75] Inventor: John Mladota, Lausanne, Switzerland

[73] Assignee: Bolton-Emerson, Inc., Lawrence, Mass.

[22] Filed: Oct. 6, 1975

[21] Appl. No.: 619,795

[52] U.S. Cl. .............................. 210/236; 210/447; 210/455; 425/197

[51] Int. Cl.² .................................... B01D 27/00

[58] Field of Search ............ 210/65, 232, 153, 236, 210/447, 499, 455; 425/153, 183, 185, 197

[56] References Cited

UNITED STATES PATENTS

| | | | |
|---|---|---|---|
| 2,786,504 | 3/1957 | Samler | 210/236 X |
| 3,455,357 | 7/1969 | Zink | 425/153 |
| 3,653,419 | 4/1972 | Schutter | 425/183 X |
| 3,804,758 | 4/1974 | Cooper et al. | 210/65 |
| 3,856,680 | 12/1974 | Elmore | 210/236 X |
| 3,900,399 | 8/1975 | Kreyenborg et al. | 210/236 |

*Primary Examiner*—Charles N. Hart
*Assistant Examiner*—Richard W. Burks
*Attorney, Agent, or Firm*—Pearson & Pearson

[57] ABSTRACT

A screen changer mounted between a flowable plastic extruder and a die has a clamp frame movable rectilinearly across the extrusion passage by fluid piston and cylinder means to successively position one of four screen blocks across the passage. A used block is removable from the frame at one end, whereupon latch mechanism retains three blocks while the frame retracts to receive a fresh block. Each block contains a filter recess, a purge recess and a pre-fill groove in the upstream face, so that the incoming block is pre-filled with plastic and purged while moving into position across the passage.

10 Claims, 6 Drawing Figures

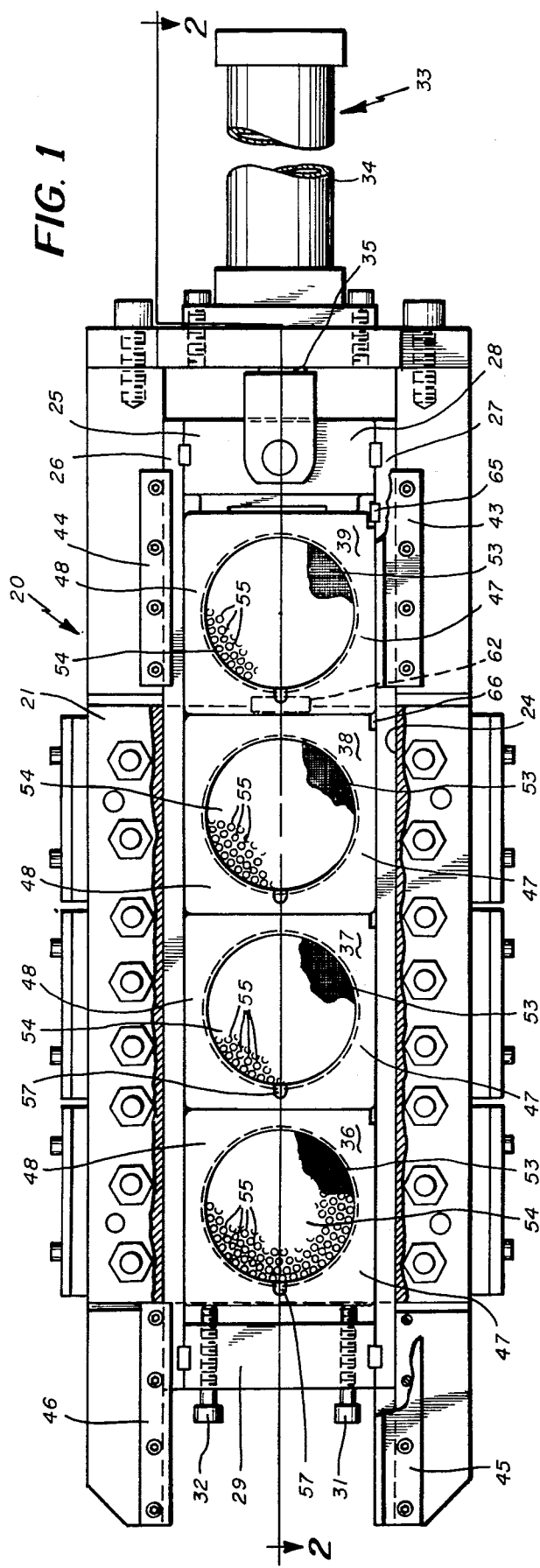
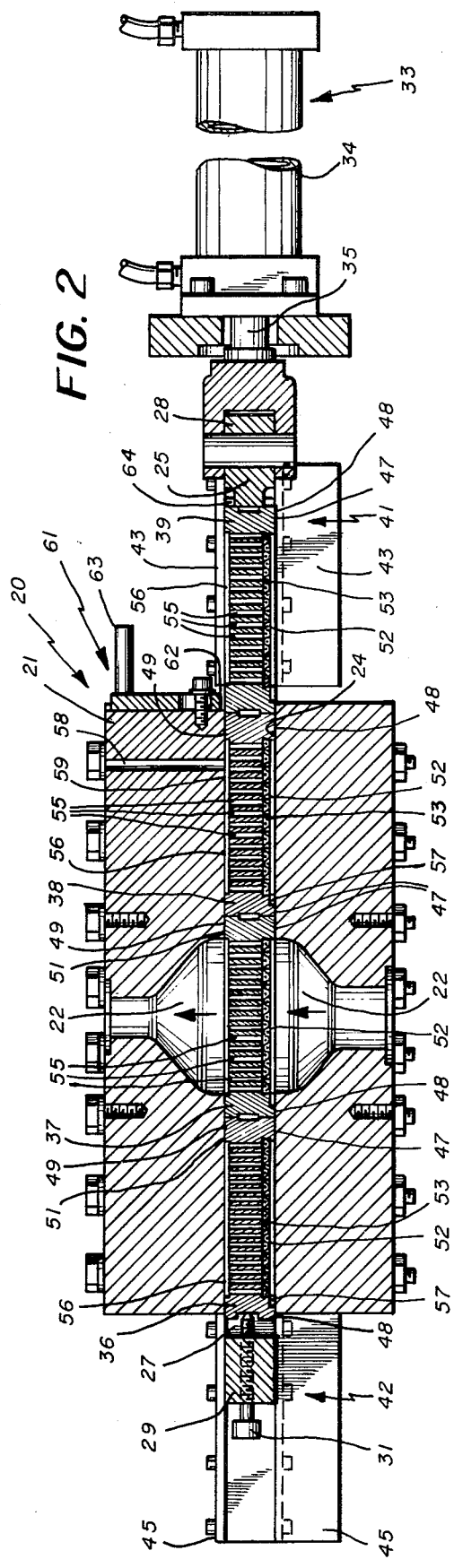

SCREEN CHANGER WITH PRE-FILL SCREEN BLOCKS

BACKGROUND OF THE INVENTION

Screen changers of many types have been proposed in the prior art; for example, the rotating screens of U.S. Pat. No. 3,455,357 to Zink of July 15, 1909, wherein there are ports and flow passages in the body of the changer for venting and prefilling each successive clean screen. Similarly in the rectilinear sliding screens of U.S. Pat. No. 3,804,758 to Cooper of Apr. 16, 1974 there are conduits in the body member for venting and pre-filling each successive clean screen, the pre-filling being initiated by a manually operated valve before the clean screen commences to move.

SUMMARY OF THE INVENTION

The screen changer of this invention, is of the rectilinear, sliding, screen block type similar to the device of the above mentioned Cooper patent, but venting and pre-filling of each successive clean block is accomplished automatically by the progressive movement of the clean screen into position across the passage, without the need for manual valving by an operator, instead of requiring bores, conduits and ports in the body of the screen changer. The pre-filling is accomplished integrally within each individual block by the provision of a shallow prefill groove in the leading central portion of the planar rim of the upstream face of the block. The pre-fill groove reaches the flow passage, as the trailing portion of the preceding block commences to move away from the passage, and guides flowable plastic into the filter recess, through the axial bores and into the purge recess of the clean screen block to pre-fill and vent the block before the axial bore area thereof reaches the passage. A purge conduit is provided in the body of the changer which connects with the trailing portion of the clean block, as it is advancing across the passage and being pre-filled to vent and purge the block into the atmosphere.

In addition to the pre-fill feature incorporated into the screen blocks, the screen changer of this invention includes a hollow rectangular clamping frame arranged to hold four such screen blocks end to end by pressure of a pair of clamp screws at the discharge end of the frame. All four blocks in the frame are pushed by a hydraulic ram to position a clean block across the passage and to project a used block outside the body. The used block is then removed, a latch holds the other three blocks in the body while the frame is retracted to receive a fresh block in the frame portion projecting from the refill side of the body. The clamp screws are then tightened to firmly retain the blocks ready for the next block substitution.

BRIEF DESCRIPTION OF THE DRAWING

FIG. 1 is a plan view of a screen changer constructed in accordance with the invention with parts broken away to show the slideway, clamping frame and screen blocks;

FIG. 2 is a side elevation in section on line 2—2 of FIG. 1 showing the pre-fill groove, filter recess, purge recess and bores in each successive screen block and showing the purge conduit in the body of the changer;

DESCRIPTION OF A PREFERRED EMBODIMENT

Figure 3:
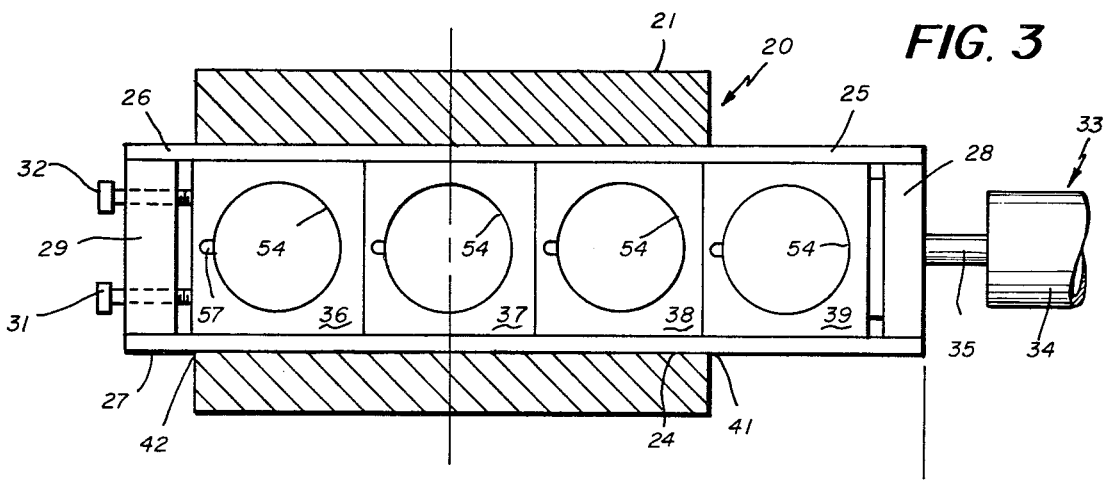
FIGS. 3 and 5 are schematic plan views and FIGS. 4 and 6 are corresponding side elevations showing the sequence of advancing the screen blocks in the frame, while the blocks are latched in position.
Figure 4:
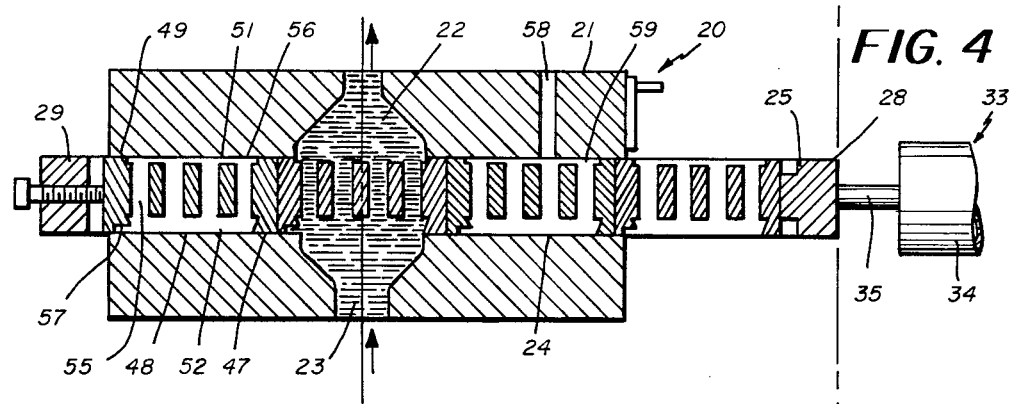

The screen changer 20 of the invention is mounted between an extruder and a die and includes a body 21 having a passage 22 for the flowable plastic material 23. Extending transversely of the passage 22 is a rectilinear slideway 24, arranged to slidably receive a hollow, rectangular clamping frame 25. Clamping frame 25 includes a pair of elongated side bars 26 and 27, and a pair of end pieces 28 and 29, the end piece 29 having a pair of threaded clamp screws 31 and 32.

Drive means 33 is provided consisting of a cylinder 34 and fluid pressure actuated piston 35, the piston 35 being adapted to move the frame 25 in the slideway 24.

Frame 25 is arranged to hold four screen blocks 36, 37, 38 and 39 end-to-end, the block at one end 41, or the other end 42, of slideway 24 extending beyond the body 21 while the other three blocks are housed within the body 21. Of the three blocks within the body 21, the central block is positioned precisely across the passage 22 to screen the flowable plastic 23 forced therethrough.

Two pairs of upper and lower guide plates 43 and 44 are provided at the end 41, to guide the frame 25 when projecting at that end, for receiving a fresh, clean screen block 39. Two similar pair of upper and lower guide plates 45 and 46 are provided at the end 42, to guide the frame 25 when projecting at that end, for enabling a used, dirty screen block 36 to be removed.

Each screen block 36, 37, 38 and 39 includes a planar rim 47 forming a upstream face 48 and a planar rim 49 forming the downstream face 51, and is preferably rectangular or square to slidably fit in clamping frame 25. The four screen blocks 36, 37, 38 and 39 are clamped end-to-end in the frame by clamp screws 31 and 32, but the end block may be removed upwardly or downwardly when the clamp screws are loosened.

The upstream face 48 of each block also includes a shallow recess 52 for a gauze, or wire mesh, filter 53, there being a circular pattern 54 of axial bores 55 connecting the recess 52 with a shallow purge recess 56 in the downstream face 51 of each block.

Figure 5:
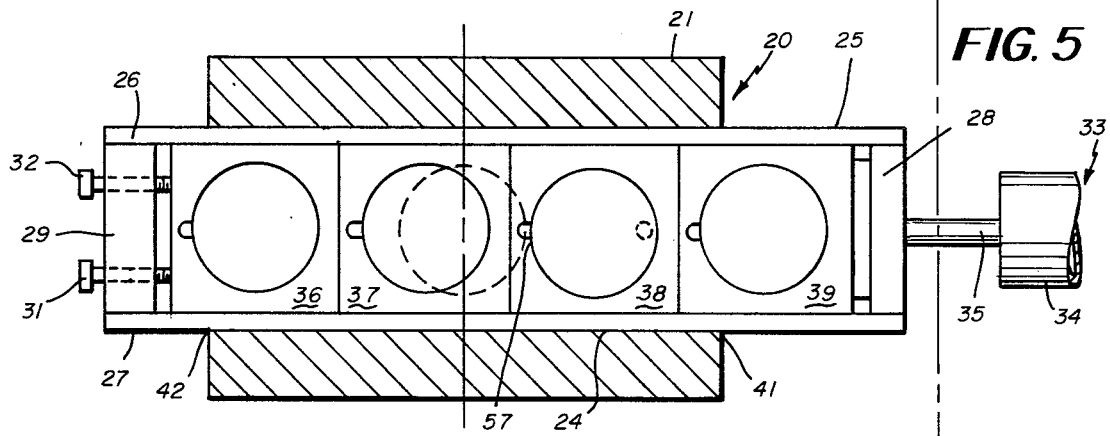
Figure 6:
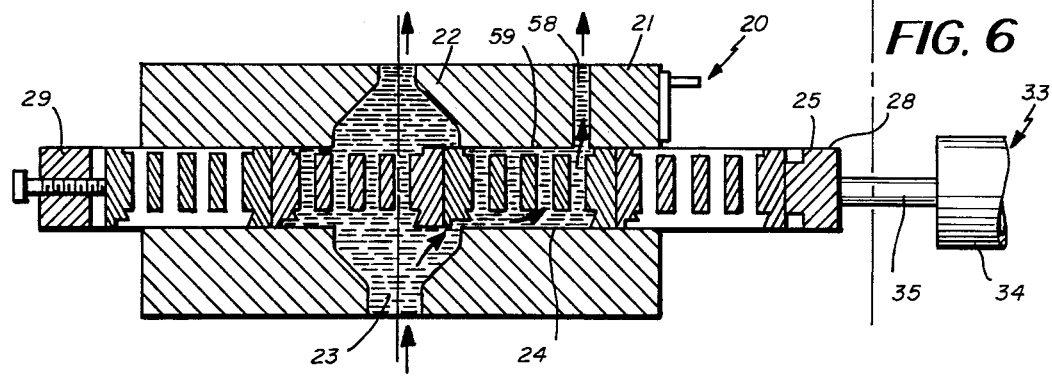

A shallow pre-fill groove 57, of relatively small area compared to the area of the circular pattern 54, is provided in the leading central portion of the planar rim 47 of the upstream face of each block, groove 57 connecting with the filter recess 52. It will thus be seen that when a screen block 37 becomes fouled with screened out foreign material, the drive means 33 may be actuated to commence sliding frame 25 toward the block discharge end 42 of body 21. The advance of the fresh clean block 38 in frame 25 causes the pre-fill groove 57 of block 38 to reach passage 22 first and to conduct flowable plastic into the filter recess 52, thence through filter 53, through axial bores 55 and into purge recess 56. A purge conduit 58 is located in body 21 in position to guide the pre-fill plastic from the rearward portion 59 of purge recess 56 to the ambient atmosphere for venting the plastic and block of air (FIGS. 5 and 6).

As fresh screen block 38 thus is pre-filled and vented through pre-fill groove 57 as it moves into screening position, and while the next preceeding block 37 is still screening the major portion of the plastic in passage 22, the used, dirty block 36 is being moved out of body 21 into exposed position where it can be removed and cleaned. Only a small portion of the plastic is by-passed through the pre-fill groove, so that there is no adverse affect on extrusion to the die.

When the pre-filled block 38 has arrived at precise screening position latch means 61 is actuated consisting in a pivotable, or slidable, detent 62 which is moved by a handle 63 to seat in a recess 64 and bar any retractive movement of the fresh clean block 39. The used dirty block 36 having been removed from the frame 25, the frame can be slidably retracted in slideway 24, sliding past the blocks 37, 38 and 39 locked in the body 21, to present an empty space for the reception of a new clean block.

I claim:

1. A screen changer for removing foreign matter from a flowable plastic advancing along a possage of an extruder, said screen changer being of the type having a plurality of screen blocks movable end-to-end along a rectilinear slideway, extending across said passage, by drive means to position said blocks individually and successively in operative screening position across said passageway and characterised by:

each said screen block having a planar rim encompassing a shallow filter recess, for receiving a filter, in the upstream face thereof, said filter covering a series of bores, the leading central portion of the planar rim of each successive screen having a pre-fill groove, extending in advance of the filter recess in the upstream face thereof for guiding said flowable plastic thereinto and through to the downstream face thereof, prior to the arrival of said filter and bores at said passage under the motion imparted by said drive means;

whereby each individual and successive screen block is pre-filled with plastic while it is being moved into operative screening position.

2. A screen changer as specified in claim 1 wherein:
said slideway is formed in a body and said body includes a purging conduit located to connect the rearward portion of the downstream face of each successive block with the atmosphere, when said pre-fill groove is in connection with said passage, to purge the screen block of air.

3. A screen changer as specified in claim 2 wherein:
each said screen block includes a shallow purge recess in the downstream face thereof, for guiding the flowable plastic pre-filling said pre-fill groove, filter recess and series of bores across the downstream face of said bores into said purging conduit.

4. A screen changer as specified in claim 1 wherein:
said prefill groove is of relatively small area and volume relative to the area and volume of the filter recess of each next preceding screen block;
whereby flow continues in substantial volume through said next preceding screen block while the succeeding screen block is being pre-filled and purged through said pre-fill groove.

5. A screen changer as specified in claim 1 wherein:
said screen blocks are slidably supported in a clamping frame, said clamping frame is slidable in said slideway, said drive means is operatively connected to said clamping frame for moving all of said blocks as a unit across said passage and latch means is provided to retain said blocks in position when said clamping frame is retracted to receive another screen block.

6. A screen changer for substituting fresh clean screen blocks for dirty screen blocks in the passage between a plastic extruder and a die, said screen changer comprising:

a body having a rectilinear slideway extending transversely across said passage; a clamping frame slideable in said slide way, said frame slidably supporting four screen blocks, one projecting outside said body and the other three housed within said body;

means for sliding said clamping frame in one direction to move all of said blocks as a unit, to position one said block across said passage;

latch means for retaining said blocks against retraction when said clamping frame is retracted to receive a fresh block, and pre-fill means, integral with, and formed in the upstream face of, each said screen block for pre-filling each individual and successive block and purging the same of air during the movement of said clamping frame in said one direction.

7. A screen changer as specified in claim 6 wherein:
said pre-filled means comprises a shallow groove of substantially less area than the screening area of said screen blocks, and located centrally of the leading edge portion of the upstream face thereof to guide plastic into said screening area before that area moves into screening position in said passage.

8. A screen changer as specified in claim 6 wherein:
said clamping frame is generally rectangular and includes a pair of clamping set screws adapted to firmly retain four said blocks end-to-end in said frame, but to release each successive used end block when projecting outside body and when said screws are lossened.

9. A screen changer as specified in claim 6 wherein:
each said screen block includes a shallow filter recess in the upstream face thereof, a shallow purge recess in the downstream face thereof, and a set of bores connecting said recesses;
and said body includes a purging conduit located to connect the purge recess of the block being pre-filled with the atmosphere to purge the block of air.

10. In a screen changer device of the type having a slideway extending across a passage for flowable plastic, adapted to slidably receive four identical rectangular screen blocks, each having a planar upstream and downstream rim, encircling a circular pattern of axial bores the combination of:

a shallow filter recess in the upstream face of said block a shallow purge recess in the downstream face of said block and a pre-fill groove in the central, leading portion of the upstream rim of each said block, for guiding flowable plastic into said filter recess, through said axial bores and into said purge recess, for pre-filling each individual and successive block with said plastic, while moving and before said axial bores reach screening position across said passage.

* * * * *